(12) United States Patent
Kodama et al.

(10) Patent No.: US 10,461,541 B2
(45) Date of Patent: Oct. 29, 2019

(54) SOLAR POWER GENERATION CONTROL DEVICE AND SOLAR POWER GENERATION SYSTEM

(71) Applicant: TOYOTA JIDOSHA KABUSHIKI KAISHA, Toyota-shi, Aichi-ken (JP)

(72) Inventors: Yuta Kodama, Toyota (JP); Hiroshi Okada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 130 days.

(21) Appl. No.: 15/889,503

(22) Filed: Feb. 6, 2018

(65) Prior Publication Data

US 2018/0233920 A1 Aug. 16, 2018

(30) Foreign Application Priority Data

Feb. 10, 2017 (JP) .................. 2017-023117

(51) Int. Cl.
| | |
|---|---|
| *B60L 1/00* | (2006.01) |
| *B60L 3/00* | (2019.01) |
| *H02G 3/00* | (2006.01) |
| *H02J 3/38* | (2006.01) |

(Continued)

(52) U.S. Cl.
CPC .............. *H02J 3/385* (2013.01); *H02S 10/40* (2014.12); *H02S 50/00* (2013.01); *Y02E 10/58* (2013.01); *Y02T 10/7083* (2013.01)

(58) Field of Classification Search
CPC .......... H02J 3/385; H02S 10/40; H02S 50/00; Y02E 10/58; Y02T 10/7083

USPC ......... 307/9.1, 10.1; 320/101; 323/234, 238; 701/22, 36; 136/246
See application file for complete search history.

(56) References Cited

U.S. PATENT DOCUMENTS

| | | | |
|---|---|---|---|
| 2011/0163710 A1* | 7/2011 | Syed ................... | B60K 16/00 320/101 |
| 2014/0028240 A1* | 1/2014 | Heumann ............ | H02J 7/355 320/101 |

(Continued)

FOREIGN PATENT DOCUMENTS

| | | |
|---|---|---|
| JP | H06-35555 A | 2/1994 |
| JP | 2005-312163 A | 11/2005 |
| JP | 2013-165533 A | 8/2013 |

*Primary Examiner* — Rexford N Barnie
*Assistant Examiner* — Toan T Vu
(74) *Attorney, Agent, or Firm* — Oliff PLC

(57) ABSTRACT

In a solar power generation control device, a memory stores an output voltage at which maximum power is obtained, for each illuminance on a panel surface of a solar panel, acquisition circuitry acquires a vehicle speed, a present illuminance on the panel surface, and first information indicating an illuminance in a prescribed area ahead of a vehicle, and calculation circuitry calculates a predicted illuminance on the panel surface, which is an illuminance after a lapse of a prescribed length of time, based on the first information and the vehicle speed. When determining that an absolute value of a difference between first and second output voltages, at which maximum powers are obtained respectively at the present and predicted illuminances, exceeds a prescribed threshold, control circuitry makes correction such that an output voltage of the solar panel coincides with the second output voltage upon the lapse of the prescribed length of time.

6 Claims, 7 Drawing Sheets

(51) Int. Cl.
H02S 10/40 (2014.01)
H02S 50/00 (2014.01)

(56) References Cited

U.S. PATENT DOCUMENTS

| | | | | |
|---|---|---|---|---|
| 2014/0358342 | A1* | 12/2014 | Marks | B60L 8/003 |
| | | | | 701/22 |
| 2015/0008735 | A1* | 1/2015 | Mizoguchi | B60L 11/1803 |
| | | | | 307/10.1 |
| 2016/0181970 | A1* | 6/2016 | Sato | H02S 20/32 |
| | | | | 136/246 |
| 2016/0272069 | A1* | 9/2016 | Maeno | B60L 58/20 |

* cited by examiner

FIG. 2

| ILLUMINANCE | MAXIMUM POWER [W] | VOLTAGE [V] AT WHICH MAXIMUM POWER IS OBTAINED |
|---|---|---|
| 1 | 4 | 8.0 |
| 2 | 6 | 8.1 |
| 3 | 8 | 8.2 |
| 4 | 10 | 8.3 |
| 5 | 12 | 8.4 |
| 6 | 14 | 8.5 |
| 7 | 16 | 8.6 |
| 8 | 18 | 8.7 |
| 9 | 20 | 8.8 |
| 10 | 22 | 8.9 |
| 11 | 24 | 9.0 |
| 12 | 26 | 9.1 |
| 13 | 28 | 9.2 |
| 14 | 30 | 9.3 |
| 15 | 32 | 9.4 |
| 16 | 34 | 9.5 |
| 17 | 36 | 9.6 |
| 18 | 38 | 9.7 |
| 19 | 40 | 9.8 |
| 20 | 42 | 9.9 |

SOLAR POWER GENERATION CONTROL DEVICE AND SOLAR POWER GENERATION SYSTEM

INCORPORATION BY REFERENCE

The disclosure of Japanese Patent Application No. 2017-023117 filed on Feb. 10, 2017 including the specification, drawings and abstract is incorporated herein by reference in its entirety.

BACKGROUND

1. Technical Field

The disclosure relates to a solar power generation control device configured to control, by a maximum power point tracking method, electric power generated by a solar panel mounted on a movable body, such as a vehicle and a solar power generation system.

2. Description of Related Art

For example, Japanese Unexamined Patent Application Publication No. 06-035555 describes a solar power generation system that adopts maximum power point tracking (MPPT) control.

SUMMARY

The maximum power point is an output voltage at which electric power (hereinafter, simply referred to as "power") generated by a solar panel is maximized. The maximum power point varies depending on the state of solar radiation received from the sun. Therefore, the maximum power point tracking control has still room for improvement in the following respect. In a case where the maximum power point significantly varies due to a significant change in the state of solar radiation received at a solar panel, such as a case where a vehicle travels on a road with a tunnel (see FIG. 6) or a case where the vehicle travels on a street in the sunshine filtering through the leaves, it may take time for an output voltage of the solar panel to reach the output voltage at the maximum power point or an output voltage of the solar panel may fail to reach or follow the output voltage at the maximum power point, after the change. In such a case, the duration of time during which the solar panel generates power at its full capacity is reduced, resulting in a decrease in the efficiency of power generation by a solar power generation system.

The disclosure provides a solar power generation control device configured to achieve high efficiency of power generation by a solar panel even under an environment where the maximum power point of the solar panel significantly varies.

A first aspect of the disclosure relates to a solar power generation control device configured to control power generated by a solar panel mounted on a vehicle by a maximum power point tracking method. The solar power generation control device includes a memory, acquisition circuitry, calculation circuitry, and control circuitry. The memory is configured to store illuminances on a panel surface of the solar panel and output voltages of the solar panel at which the power generated by the solar panel is maximized at the corresponding illuminances. The illuminances and the output voltages are associated with each other. The acquisition circuitry is configured to acquire a travelling speed of the vehicle, a present illuminance on the panel surface, and first information indicating an illuminance in a prescribed area ahead of the vehicle. The calculation circuitry is configured to calculate a predicted illuminance on the panel surface based on the first information and the travelling speed. The predicted illuminance is an illuminance on the panel surface after a lapse of a prescribed length of time from a present time. The control circuitry is configured to: i) calculate an absolute value of a difference between a first output voltage at which maximum power is obtained at the present illuminance, and a second output voltage at which maximum power is obtained at the predicted illuminance, with reference to information stored in the memory; ii) determine whether the absolute value of the difference exceeds a prescribed threshold, and iii) correct, when the absolute value of the difference is determined to exceed the prescribed threshold, an output voltage of the solar panel such that the output voltage of the solar panel coincides with the second output voltage upon the lapse of the prescribed length of time, to execute maximum power point tracking control.

A second aspect of the disclosure relates to a solar power generation control device configured to control power generated by a solar panel mounted on a movable body. The solar power generation control device includes: a memory configured to store information about illuminances corresponding to solar radiation received at the solar panel and output voltages of the solar panel at which the power generated by the solar panel is maximized at the corresponding illuminances, the information about the illuminances and the output voltages being associated with each other; acquisition circuitry configured to acquire first illuminance information about an illuminance corresponding to solar radiation presently received at the solar panel and second illuminance information about an illuminance at a location ahead of the movable body in a travelling direction of the movable body; and calculation circuitry configured to vary the output voltage of the solar panel based on a difference between the first illuminance information and the second illuminance information.

A third aspect of the disclosure relates to a solar power generation system. The solar power generation system includes: a solar panel mounted on a vehicle and configured to generate power; outside information acquisition circuitry configured to capture an image of a prescribed area ahead of the vehicle in a travelling direction of the vehicle, determine an illuminance at each position in the captured image, and output first information about the determined illuminance; and a solar power generation control device configured to control power generated by the solar panel by a maximum power point tracking method, the solar power generation control device including a memory configured to store illuminances on a panel surface of the solar panel and output voltages of the solar panel at which the power generated by the solar panel is maximized at the corresponding illuminances, the illuminances and the output voltages being associated with each other, acquisition circuitry configured to acquire the first information, a travelling speed of the vehicle, and a present illuminance on the panel surface, calculation circuitry configured to calculate a predicted illuminance on the panel surface based on the first information and the travelling speed, the predicted illuminance being an illuminance on the panel surface after a lapse of a prescribed length of time from a present time, and control circuitry configured to i) calculate an absolute value of a difference between a first output voltage at which maximum power is obtained at the present illuminance, and a second output voltage at which maximum power is obtained at the predicted illuminance with reference to information stored in the memory, ii) determine whether the absolute value of the difference exceeds a prescribed threshold, and iii) correct, when the absolute value of the difference is determined to exceed the prescribed threshold, an output voltage of the solar panel such that the output voltage of the solar panel coincides with the second output voltage upon the lapse of the prescribed length of time, to execute maximum power point tracking control.

According to the above aspects, when it is determined that there will be a significant change from the output voltage, at which the maximum power is obtained at the illuminance at the present vehicle position, to the output voltage, at which the maximum power is obtained at the predicted illuminance at the location that the vehicle reaches after the lapse of the prescribed length of time from the present time, the output voltage of the solar panel is corrected such that the output voltage of the solar panel coincides with the output voltage corresponding to the predicted illuminance upon the lapse of the prescribed length of time.

This control eliminates the need to cause the output voltage of the solar panel to approach, step by step, from the output voltage, at which the maximum power is obtained at the present illuminance, to the output voltage, at which the maximum power is obtained at the predicted illuminance, under the maximum power point tracking control, in a case where the maximum power point varies so significantly that the voltage control cannot follow the significant variation. Thus, it is possible to reduce the length of time that is required for the output voltage of the solar panel to reach the maximum power point after the variation. The efficiency of power generation by the solar panel is thus enhanced.

In the above aspect, the prescribed threshold may be set to a value equal to or larger than a minimum voltage width within which the control circuitry is able to control the output voltage of the solar panel.

With this setting, when the variation is so small that the output voltage of the solar panel reaches the maximum power point through execution of the maximum power point tracking control by only one step, the output voltage of the solar panel is not corrected. Therefore, unnecessary control is prevented from being executed. As a result, the efficiency of power generation by the solar panel is enhanced.

In the above aspect, the prescribed length of time may be equal to a control period with which the solar power generation control device repeatedly executes the maximum power point tracking control.

With this setting, the period with which the predicted illuminance on the panel surface is calculated coincides with the period with which the output voltage of the solar panel is controlled. Therefore, the process for correcting the output voltage of the solar panel based on a variation in the illuminance can be easily incorporated in an algorithm of the maximum power point tracking control.

In the above aspect, the acquisition circuitry may further acquire tunnel information about a position of a tunnel that lies on a travelling route, the calculation circuitry may calculate a predicted illuminance on the panel surface based on the tunnel information, in addition to the first information and the travelling speed, and the control circuitry may correct, based on the predicted illuminance calculated in consideration of the tunnel information, the output voltage of the solar panel to an output voltage at which the maximum power is obtained at the predicted illuminance.

The use of the tunnel information allows accurate determination of locations where the maximum power point significantly varies, that is, an entrance and an exit of a tunnel that lies ahead of the vehicle in its travelling direction. Therefore, the accuracy of prediction of the predicted illuminance is increased. As a result, it is possible to accurately correct the output voltage of the solar panel to an output voltage at which the maximum power is obtained at the predicted illuminance. The efficiency of power generation by the solar panel is thus enhanced.

With the solar power generation control device, it is possible to achieve high efficiency of power generation by the solar panel even under an environment where the maximum power point of the solar panel significantly varies.

BRIEF DESCRIPTION OF THE DRAWINGS

Features, advantages, and technical and industrial significance of example embodiments of the disclosure will be described below with reference to the accompanying drawings, in which like numerals denote like elements, and wherein:

FIG. 2 is a table illustrating an example of information stored in a storage unit in FIG. 1;

DETAILED DESCRIPTION OF EMBODIMENTS

Outline of the Disclosure

A solar power generation control device according to the disclosure predicts a change in the amount of power to be generated by a solar panel due to, for example, a change in the state of solar radiation received at the solar panel, which is caused by a movement (travel) of a vehicle. When it is predicted that a vehicle movement will cause a significant change in the amount of power to be generated by the solar panel, an output voltage of the solar panel is corrected such that the solar panel is quickly enabled to generate power at the maximum power point after the vehicle movement. This enhances the efficiency of power generation by the solar panel.

System Configuration

Figure 1:
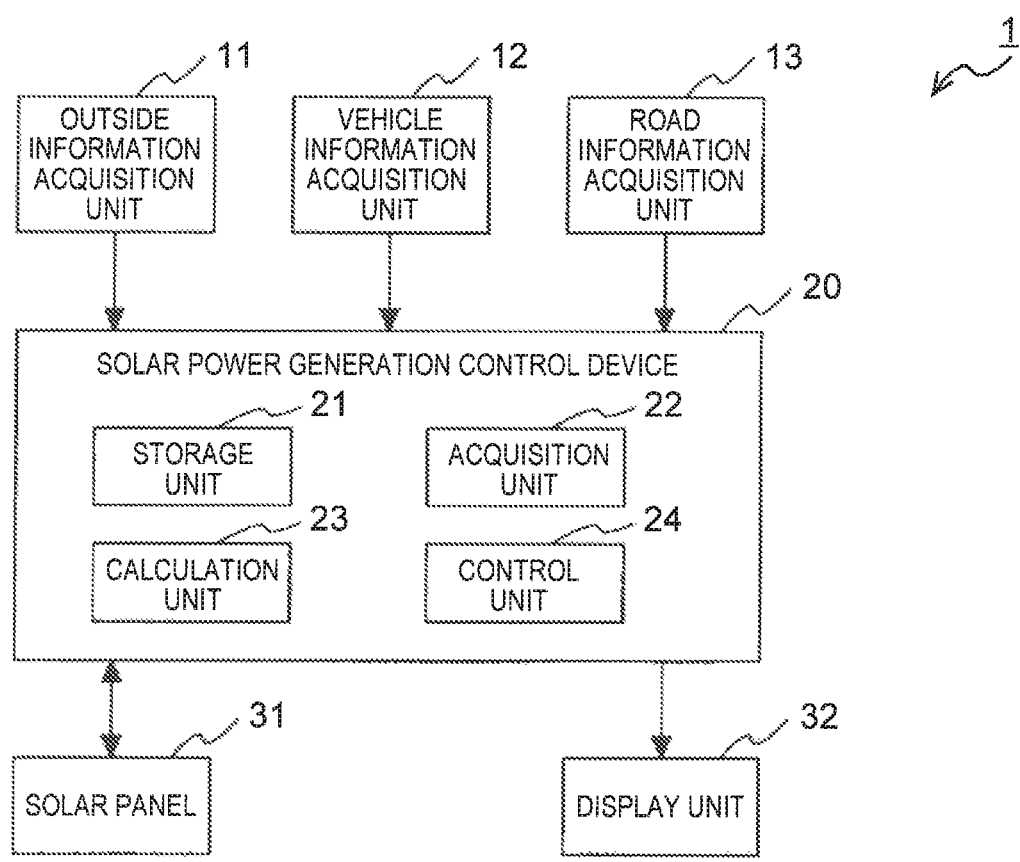
FIG. 1 is a diagram schematically illustrating the configuration of a solar power generation system including a solar power generation control device according to an embodiment of the disclosure.

FIG. 1 is a diagram schematically illustrating the configuration of a solar power generation system 1 including a solar power generation control device 20 according to an embodiment of the disclosure. The solar power generation system 1 illustrated in FIG. 1 includes an outside information acquisition unit 11, a vehicle information acquisition unit 12, a road information acquisition unit 13, the solar power generation control device 20 according to the present embodiment, a solar panel 31, and a display unit 32. The solar power generation system 1 is mounted in, for example, a movable body, such as a vehicle.

The outside information acquisition unit 11 is configured to acquire information about the outside of the vehicle (hereafter, referred to as "outside information"). The outside information is information mainly about an illuminance in a prescribed area ahead of the vehicle. Examples of the outside information acquisition unit 11 include a camera that is provided on a front portion of the vehicle and that is equipped with an image sensor configured to output the outside information in the form of an image, such as a charge coupled device (CCD) or a complementary metal oxide semiconductor (CMOS). The image of the prescribed area ahead of the vehicle, which is the outside information acquired by the outside information acquisition unit 11, is output to the solar power generation control device 20.

The vehicle information acquisition unit 12 is configured to acquire information about the state of the vehicle. An example of the information about the state of the vehicle is a travelling speed of the vehicle. Examples of the vehicle information acquisition unit 12 configured to acquire a travelling speed include a sensor configured to detect a rotation speed of an output shaft of a transmission (not illustrated). The vehicle information acquisition unit 12 may be, for example, a global positioning system (GPS) receiver as long as it is configured to acquire vehicle-speed information.

Another example of the information about the state of the vehicle is an illuminance on a panel surface, which corresponds to the solar radiation presently received at the solar panel 31. Examples of the vehicle information acquisition unit 12 configured to acquire an illuminance include an illuminance sensor (not illustrated) provided in the solar panel 31. The travelling speed of the vehicle and the illuminance on the panel surface of the solar panel 31, which are acquired by the vehicle information acquisition unit 12, are output to the solar power generation control device 20.

The road information acquisition unit 13 is configured to acquire information about a road environment under which the vehicle is travelling. The road information is mainly information about a position of a tunnel that lies on a travelling route. Examples of the road information acquisition unit 13 include an on-board navigation system (not illustrated). The road information acquisition unit 13 is configured to extract a position of a tunnel from, for example, a map database built in the system or obtained from the outside of the vehicle through communication. The tunnel information, which is the information about the road environment acquired by the road information acquisition unit 13, is output to the solar power generation control device 20.

The solar panel 31 is a component configured to convert solar energy into electric energy, such as a solar cell module. The solar panel 31 receives solar light to generate power. The solar panel 31 may be mounted, for example, on a roof of the vehicle. The power generated by the solar panel 31 is output to the solar power generation control device 20.

The display unit 32 is configured to display information, such as the amount of power generated by the solar panel 31, under instructions output from the solar power generation control device 20. Examples of the display unit 32 include a head-up display (HUD), a monitor of the navigation system, and a device (not illustrated), such as a meter panel.

The solar power generation control device 20 is connected to the outside information acquisition unit 11, the vehicle information acquisition unit 12, the road information acquisition unit 13, the solar panel 31, and the display unit 32. The solar power generation control device 20 is configured to control the power to be generated by the solar panel 31 by the maximum power point tracking method.

The solar power generation control device 20 is typically an electronic control unit (ECU) including a central processing unit (CPU), a memory, and an input-output interface. The solar power generation control device 20 is configured to implement functions of a storage unit 21, an acquisition unit 22, a calculation unit 23, and a control unit 24 (all of which will be described later) when the CPU reads out programs stored in the memory and execute the programs.

The storage unit 21 stores, in advance, information indicating an output voltage at which the power generated by the solar panel 31 is maximized (maximum power point) at each illuminance on the panel surface of the solar panel 31. FIG. 2 illustrates an example of a table indicating each illuminance on the panel surface associated with the maximum power obtained at the corresponding illuminance and the voltage at which the maximum power is obtained at the corresponding illuminance. The numeric values illustrated in the table in FIG. 2 vary depending on the specifications of the solar panel 31.

The acquisition unit 22 acquires the image of the prescribed area ahead of the vehicle from the outside information acquisition unit 11. The acquisition unit 22 also acquires the travelling speed of the vehicle from the vehicle information acquisition unit 12. The acquisition unit 22 also acquires the illuminance on the panel surface, which corresponds to the solar radiation presently received at the solar panel 31 (hereafter, referred to as "present illuminance on the panel surface"), from the vehicle information acquisition unit 12.

The calculation unit 23 analyzes the image of the prescribed area ahead of the vehicle acquired by the acquisition unit 22, and determines, through quantification into numerals, an illuminance at each position in the image based on the information about light and dark in the image created by variations in the amount of solar radiation. The calculation unit 23 then calculates an illuminance at a given position in the image, based on the determined illuminance at each position in the image and the travelling speed of the vehicle acquired by the acquisition unit 22.

The given position is a location that the vehicle is predicted to reach by travelling. The given position may be determined, for example, based on the length of time that elapses from a time point at which the image of the prescribed area is acquired by the outside information acquisition unit 11. The calculation unit 23 calculates an illuminance corresponding to the solar radiation that is predicted to be received at the panel surface of the solar panel 31 after a lapse of a prescribed length of time from the present time (hereafter, referred to as "predicted illuminance on the panel surface"). The prescribed length of time will be described later in detail.

The given position may be determined based on, in place of the elapsed time, a movement distance over which the vehicle moves by travelling from a vehicle position at which the image of the prescribed area is acquired by the outside information acquisition unit 11.

The control unit 24 extracts an output voltage of the solar panel 31 corresponding to the present illuminance on the panel surface, and an output voltage of the solar panel 31 corresponding to the predicted illuminance on the panel surface, based on the correlation between the illuminance on the panel surface and the voltage at which the maximum power is obtained. The correlation is stored in the storage unit 21. The control unit 24 then compares a difference between the extracted output voltages with a prescribed threshold, and controls the maximum power point tracking operation based on the result of comparison. The prescribed threshold and the control of the maximum power point tracking operation will be described later in detail.

The control unit 24 is configured to monitor an amount of power presently generated by the solar panel 31 and issue, to the display unit 32, an instruction to display information about the amount of power generated by the solar panel 31 on a screen of the display unit 32, as necessary.

Control by Solar Power Generation Control Device

First Example

Figure 3:
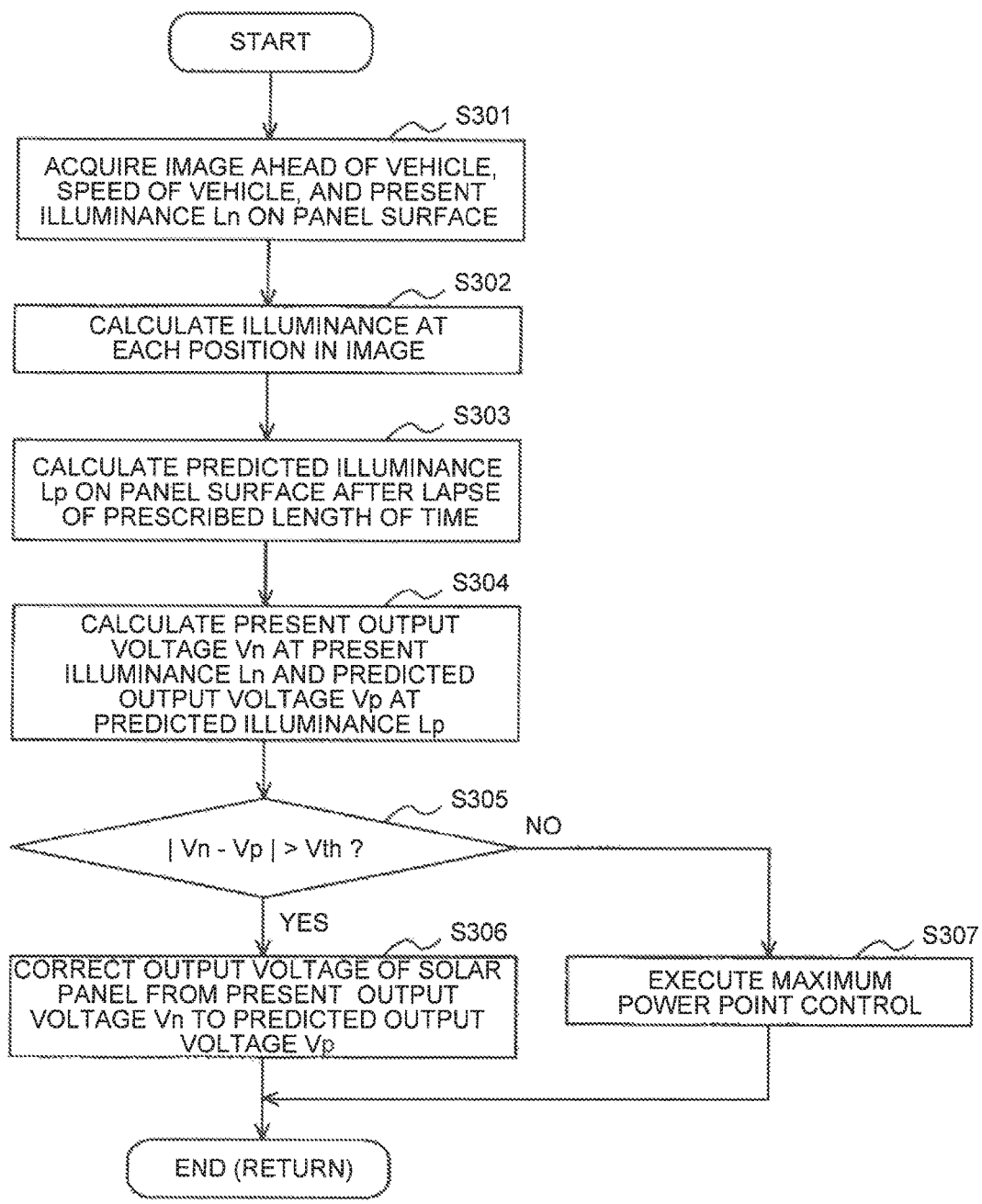
FIG. 3 is a flowchart illustrating a first example of control executed by the solar power generation control device.

Next, with reference also to FIG. 3, description will be provided on a first example of power generation control for the solar panel, which is executed by the solar power generation control device 20 according to an embodiment of the disclosure. FIG. 3 is a flowchart illustrating the procedure of the power generation control according to the first example.

The process illustrated in FIG. 3 is started when the solar power generation system 1 is activated in response to, for example, power-on, and is repeatedly executed at prescribed time intervals until the solar power generation system 1 is stopped in response to, for example, power-off.

In Step S301, the acquisition unit 22 acquires an image of a prescribed area ahead of a vehicle from the outside information acquisition unit 11. The acquisition unit 22 also acquires a travelling speed of the vehicle from the vehicle information acquisition unit 12. The acquisition unit 22 also acquires a present illuminance Ln on the panel surface of the solar panel 31 from the vehicle information acquisition unit 12. After the acquisition unit 22 acquires the image of the prescribed area ahead of the vehicle, the travelling speed of the vehicle, and the present illuminance Ln on the panel surface, the process proceeds to Step S302.

In Step S302, the calculation unit 23 analyzes the image of the prescribed area ahead of the vehicle to calculate an illuminance at each position in the image. As described above, the illuminance at each position in the image is determined based on, for example, the information about light and dark in the image. After the illuminance at each position in the image is calculated, the process proceeds to Step S303.

In Step S303, based on the travelling speed of the vehicle and the illuminance at each position in the image, a predicted illuminance Lp on the panel surface of the solar panel 31 after a lapse of a prescribed length of time t from the present time is calculated.

The calculation may be executed as follows, for example. First, based on the travelling speed of the vehicle and information about a predetermined scaled distance in an image region, a position (coordinates) in the image that the vehicle is predicted to reach after a lapse of the prescribed length of time t from the present time is determined. When the position in the image is determined, an illuminance at the determined position is extracted. The extracted illuminance is determined as the predicted illuminance Lp corresponding to the solar radiation that is predicted to be received at the panel surface of the solar panel 31 when the vehicle has moved (travelled) for the prescribed length of time t from the present time.

For example, when the prescribed length of time t is one second (t=1 sec) and the travelling speed is 40 km per hour (40 km/h), an illuminance at a position in the image, which corresponds to a location about 14 m ahead of the vehicle that the vehicle is predicted to reach after one second, is extracted. Then, the extracted illuminance is determined as the predicted illuminance Lp corresponding to the solar radiation that is predicted to be received at the panel surface of the solar panel 31 after a lapse of one second.

The prescribed length of time t may be set to any length of time. However, from the viewpoint of enhancement in the efficiency of power generation by the solar panel 31, the prescribed length of time t is desirably set to the same length of time as that of a period (control period) with which the power generation control (Step S301 to Step S307) is repeatedly executed.

After the predicted illuminance Lp on the panel surface is calculated in Step S303, the process proceeds to Step S304.

In Step S304, the control unit 24 extracts a present output voltage Vn and a predicted output voltage Vp based on the information stored in the storage unit 21. The present output voltage Vn is an output voltage of the solar panel 31, at which the maximum power is obtained at the present illuminance Ln on the panel surface. The predicted output voltage Vp is an output voltage of the solar panel 31, at which the maximum power is obtained at the predicted illuminance Lp on the panel surface. After the present output voltage Vn and the predicted output voltage Vp are extracted, the process proceeds to Step S305.

In Step S305, the control unit 24 determines whether the absolute value of a difference ($|Vn-Vp|$) between the present output voltage Vn and the predicted output voltage Vp exceeds a prescribed threshold Vth ($|Vn-Vp|>Vth$).

The prescribed threshold Vth may be set to, for example, a value equal to or larger than a minimum voltage width (control voltage step width) within which the control unit 24 is able to control the output voltage of the solar panel 31 by the maximum power point tracking method. For example, when the minimum voltage width is 0.2 V, the prescribed threshold Vth may be set equal to or higher than 0.2 V.

When the control unit 24 determines in Step S305 that the absolute value of the difference between the present output voltage Vn and the predicted output voltage Vp exceeds the prescribed threshold Vth (Yes in S305), the process proceeds to Step S306. On the other hand, when the control unit 24 determines in Step S305 that the absolute value of the difference between the present output voltage Vn and the predicted output voltage Vp does not exceed the prescribed threshold Vth (No in S305), the process proceeds to Step S307.

In Step S306, based on a determination that there will be a significant change from the present output voltage Vn to the predicted output voltage Vp due to a predicted variation in the solar radiation, the control unit 24 corrects the output voltage of the solar panel 31 from the present output voltage Vn at which the maximum power is obtained at the present illuminance Ln, to the predicted output voltage Vp at which the maximum power is obtained at the predicted illuminance Lp. When the output voltage of the solar panel 31 is corrected to the predicted output voltage Vp, one flow process (one period) of the power generation control for the solar panel ends, and the process returns to the initial step.

In Step S307, based on a determination that there will be a small change from the present output voltage Vn to the predicted output voltage Vp due to a predicted variation in the solar radiation, the control unit 24 executes the maximum power point tracking control (MPPT control) by one step. Thus, one flow process (one period) of the power generation control for the solar panel ends, and the process returns to Step S301.

For example, in a case where the prescribed threshold Vth is 0.7 V (Vth=0.7 V), when the present output voltage Vn of the solar panel 31 is 8.2 V (Vn=8.2 V) at the present illuminance Ln on the panel surface, which is three (Ln=3), and the predicted output voltage Vp of the solar panel 31 is 9.3 V (Vp=9.3 V) at the predicted illuminance Lp on the panel surface, which is 14 (Lp=14), the condition in Step S305 is satisfied. The output voltage of the solar panel 31 is therefore corrected from the present output voltage Vn of 8.2 V to the predicted output voltage Vp of 9.3V in Step S306. The maximum power point tracking control based on the predicted output voltage Vp of 9.3 V is executed in the next flow process.

For example, in a case where the prescribed threshold Vth is 0.7 V (Vth=0.7 V), when the present output voltage Vn of the solar panel 31 is 8.2 V (Vn=8.2 V) at the present illuminance Ln on the panel surface, which is three (Ln=3), and the predicted output voltage Vp of the solar panel 31 is 8.3 V (Vp=8.3 V) at the predicted illuminance Lp on the panel surface, which is 4 (Lp=4), the condition in Step S305 is not satisfied. The maximum power point tracking control based on the present output voltage Vn of 8.2 V is executed in Step S307.

As described above, in the first example of the power generation control, the predicted illuminance Lp on the panel surface of the solar panel 31 after the movement (travel) of the vehicle is predicted based on the image of the prescribed area ahead of the vehicle and the travelling speed of the vehicle. When it is determined that there will be a significant change from the present output voltage Vn, at which the maximum power is obtained at the present illuminance Ln on the panel surface, to the predicted output voltage Vp, at which the maximum power is obtained at the predicted illuminance Lp, the control unit 24 corrects the output voltage of the solar panel 31 to the predicted output voltage Vp. This reduces the length of time that is required for the output voltage of the solar panel 31 to reach the maximum power point.

The power generation control makes it possible to avoid the situation where, due to a variation in the voltage-power characteristic of the solar panel 31 caused by a significant change in the solar radiation state, the output voltage, which has been controlled until the occurrence of variation, falls out of a range of the voltage-power characteristic and it suddenly becomes impossible to control the output voltage.

Second Example

Figure 4:
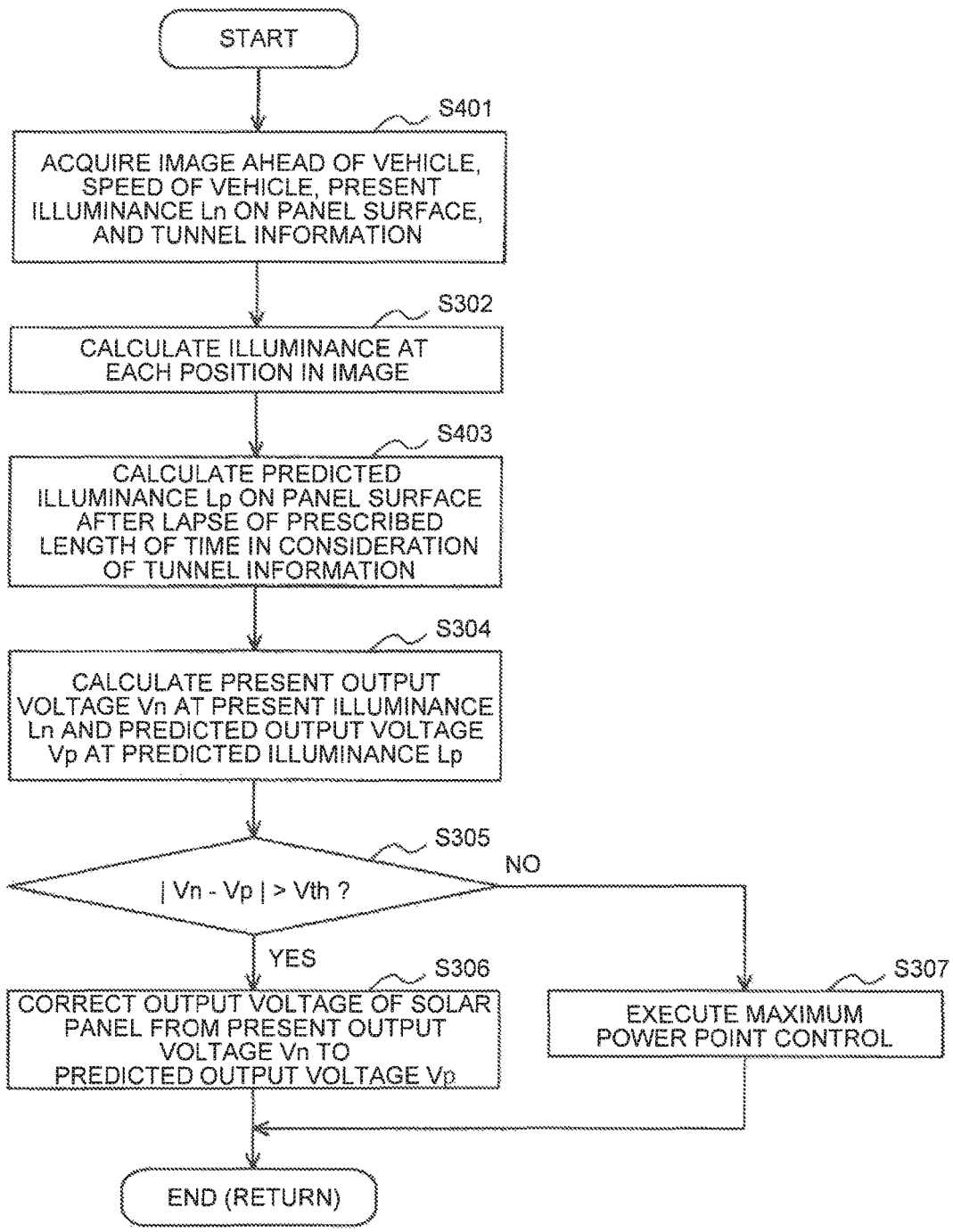
FIG. 4 is a flowchart illustrating a second example of control executed by the solar power generation control device.

Next, with reference also to FIG. 4, description will be provided on a second example of power generation control for the solar panel 31, which is executed by the solar power generation control device 20 according to an embodiment of the disclosure. FIG. 4 is a flowchart illustrating the procedure of the power generation control according to the second example.

The power generation control according to the second example illustrated in FIG. 4 differs from that according to the first example, in that the processes in Step S401 and Step S403 are different from the processes in Step S301 and Step S303, respectively. Detailed description will be provided below on the processes in Step S401 and Step S403 in the second example, and the other processes are denoted by the same step numbers as those in the first example and will not be described.

In Step 401, the acquisition unit 22 acquires an image of a prescribed area ahead of the vehicle from the outside information acquisition unit 11. The acquisition unit 22 also acquires a travelling speed of the vehicle from the vehicle information acquisition unit 12. The acquisition unit 22 also acquires a present illuminance Ln on the panel surface of the solar panel 31 from the vehicle information acquisition unit 12. The acquisition unit 22 further acquires tunnel information from the road information acquisition unit 13. After the acquisition unit 22 acquires the image of the prescribed area ahead of the vehicle, the travelling speed of the vehicle, and the present illuminance Ln on the panel surface, and the tunnel information, the process proceeds to Step S302.

In Step S403, based on the travelling speed of the vehicle, the tunnel information, and the illuminance at each position in the image, a predicted illuminance Lp on the panel surface of the solar panel 31 after a lapse of a prescribed length of time t from the present time is calculated.

The calculation may be executed as follows, for example. First, based on the travelling speed of the vehicle and information about a predetermined scaled distance in an image region, a position (coordinates) in the image that the vehicle is predicted to reach after a lapse of the prescribed length of time t from the present time is determined. When the position in the image is determined, an illuminance at the determined position is extracted. The extracted illuminance is determined as the predicted illuminance Lp corresponding to the solar radiation that is predicted to be received at the panel surface of the solar panel 31 when the vehicle has moved (travelled) for the prescribed length of time t from the present time. Next, based on the travelling speed of the vehicle and the tunnel information, a length of time until the vehicle enters a tunnel or a length of time until the vehicle exits from the tunnel is determined. Then, whether the illuminance at the determined position matches the tunnel information is determined. It is determined that the illuminance does not match the tunnel information, for example, when the illuminance indicated at the determined position in the image is high although the vehicle is supposed to have entered the tunnel according to the tunnel information, or when the illuminance indicated at the determined position in the image is low although the vehicle is supposed to have exited from the tunnel according to the tunnel information. When it is determined that the illuminance does not match the tunnel information, the predicted illuminance Lp determined as described above is corrected based on the tunnel information as appropriate.

As described above, in the second example of the power generation control, the predicted illuminance Lp on the panel surface of the solar panel 31 after a lapse of the prescribed length of time t from the present time is corrected based on the tunnel information, in addition to the image of the prescribed area ahead of the vehicle and the travelling speed of the vehicle that are used in the calculation in the first example. Thus, the accuracy of prediction of the predicted illuminance Lp in the control in the second example is higher than that in the control in the first example. As a result, it is possible to accurately correct the output voltage of the solar panel 31 to the predicted output voltage Vp at which the maximum power is obtained at the predicted illuminance.

Operation and Advantageous Effects of Embodiment

With the solar power generation control device 20 according to the present embodiment of the disclosure described above, when it is determined that there will be a significant change, which exceeds the threshold Vth, from the present output voltage Vn, at which the maximum power is obtained at the present illuminance Ln at the present vehicle position, to the predicted output voltage Vp, at which the maximum power is obtained at the predicted illuminance Lp at the location that the vehicle reaches after a lapse of the prescribed length of time t from the present time, the output voltage of the solar panel 31 is corrected such that the output voltage of the solar panel 31 coincides with the predicted output voltage Vp upon the lapse of the prescribed length of time t (at the location that the vehicle reaches upon the lapse of the prescribed length of time t).

This control eliminates the need to cause the output voltage of the solar panel 31 to approach, step by step, from the present output voltage Vn, at which the maximum power is obtained at the present illuminance Ln, to the predicted output voltage Vp, at which the maximum power is obtained at the predicted illuminance Lp, under the maximum power point tracking control, in a case where the maximum power point varies so significantly that the voltage control cannot follow the significant variation. Thus, it is possible to reduce the length of time that is required for the output voltage of the solar panel 31 to reach the maximum power point after the variation. The efficiency of power generation by the solar panel 31 is thus enhanced.

The power generation control makes it possible to avoid the situation where, due to a variation in the voltage-power characteristic of the solar panel 31 caused by a significant change in the solar radiation state, the output voltage, which has been controlled until the occurrence of variation, falls out of a range of the voltage-power characteristic and it suddenly becomes impossible to control the output voltage.

With the solar power generation control device 20 according to the present embodiment, the prescribed threshold Vth may be set to a value equal to or larger than the minimum voltage width within which the control unit 24 is able to control the output voltage of the solar panel 31.

Thus, when the variation is so small that the output voltage of the solar panel 31 reaches the maximum power point through execution of the maximum power point tracking control by only one step, the output voltage of the solar panel 31 is not corrected. Therefore, unnecessary control is prevented from being executed. As a result, the efficiency of power generation by the solar panel is enhanced.

With the solar power generation control device 20 according to the present embodiment, the prescribed length of time t may be set to the same length of time as that of the control period with which the power generation control according to the present embodiment is repeatedly executed.

Thus, the period with which the predicted illuminance on the panel surface is calculated coincides with the period with which the output voltage of the solar panel is controlled. Therefore, the process for correcting the output voltage of the solar panel based on a variation in the illuminance can be easily incorporated in an algorithm of the maximum power point tracking control.

With the solar power generation control device 20 according to the present embodiment, the tunnel information stored in, for example, the on-board navigation system may be used to predict the predicted illuminance Lp on the panel surface of the solar panel 31.

The use of the tunnel information allows accurate determination of locations where the maximum power point significantly varies, that is, an entrance and an exit of a tunnel that lies ahead of the vehicle in its travelling direction. Therefore, the accuracy of prediction of the predicted illuminance Lp is increased. As a result, it is possible to accurately correct the output voltage of the solar panel to an output voltage at which the maximum power is obtained at the predicted illuminance. The efficiency of power generation by the solar panel is thus enhanced.

In the solar power generation system 1 including the solar power generation control device 20 according to the present embodiment, if a camera device for, for example, driving safety, which has already been mounted in the vehicle, is used as the outside information acquisition unit 11, it is possible to implement the function of the solar power generation control device 20 with the use of software, without providing additional hardware. Therefore, the installation cost of the solar power generation control device 20 is reduced.

The solar power generation control device 20 according to the present embodiment quickly enables the solar panel 31 to generate power at the maximum power point, even after the state of solar radiation received at the solar panel 31 significantly varies (the maximum power point tracking operation is executed earlier). Therefore, when the solar power generation system 1 is configured such that the amount of power generated by the solar panel 31 is displayed on the display unit 32 on a real-time basis, the deviation between the amount of power generation expected by a driver based on the state of solar radiation and the actual amount of power generation displayed on the display unit 32 is decreased. Thus, a feeling of strangeness given to the driver is reduced.

Modified Example

Figure 7:
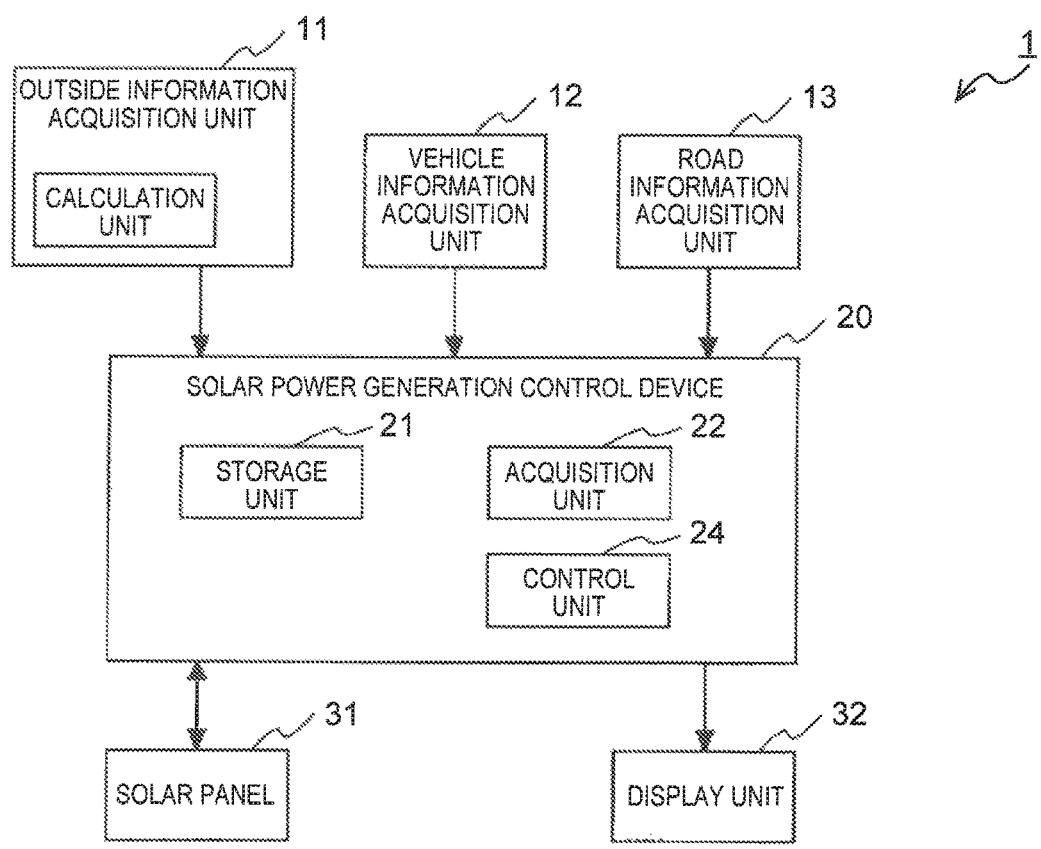
FIG. 7 is a diagram schematically illustrating the configuration of a solar power generation system including the solar power generation control device according to the modified example of the disclosure.

In the solar power generation system 1 according to the foregoing embodiment, the calculation unit 23 of the solar power generation control device 20 analyzes an image of a prescribed area ahead of a vehicle acquired by the acquisition unit 22 to calculate an illuminance at each position in the image. However, the outside information acquisition unit 11 may have the function of calculating an illuminance at each position in the image, so that the calculation unit 23 does not calculate an illuminance at each position in the image. That is, the outside information acquisition unit 11 may be configured to capture an image of a prescribed area ahead of the vehicle, determine an illuminance at each position in the captured image, and output information about the determined illuminance to the solar power generation control device 20. FIG. 7 illustrates the configuration of a solar power generation system 1 according to this modified example.

Figure 5:
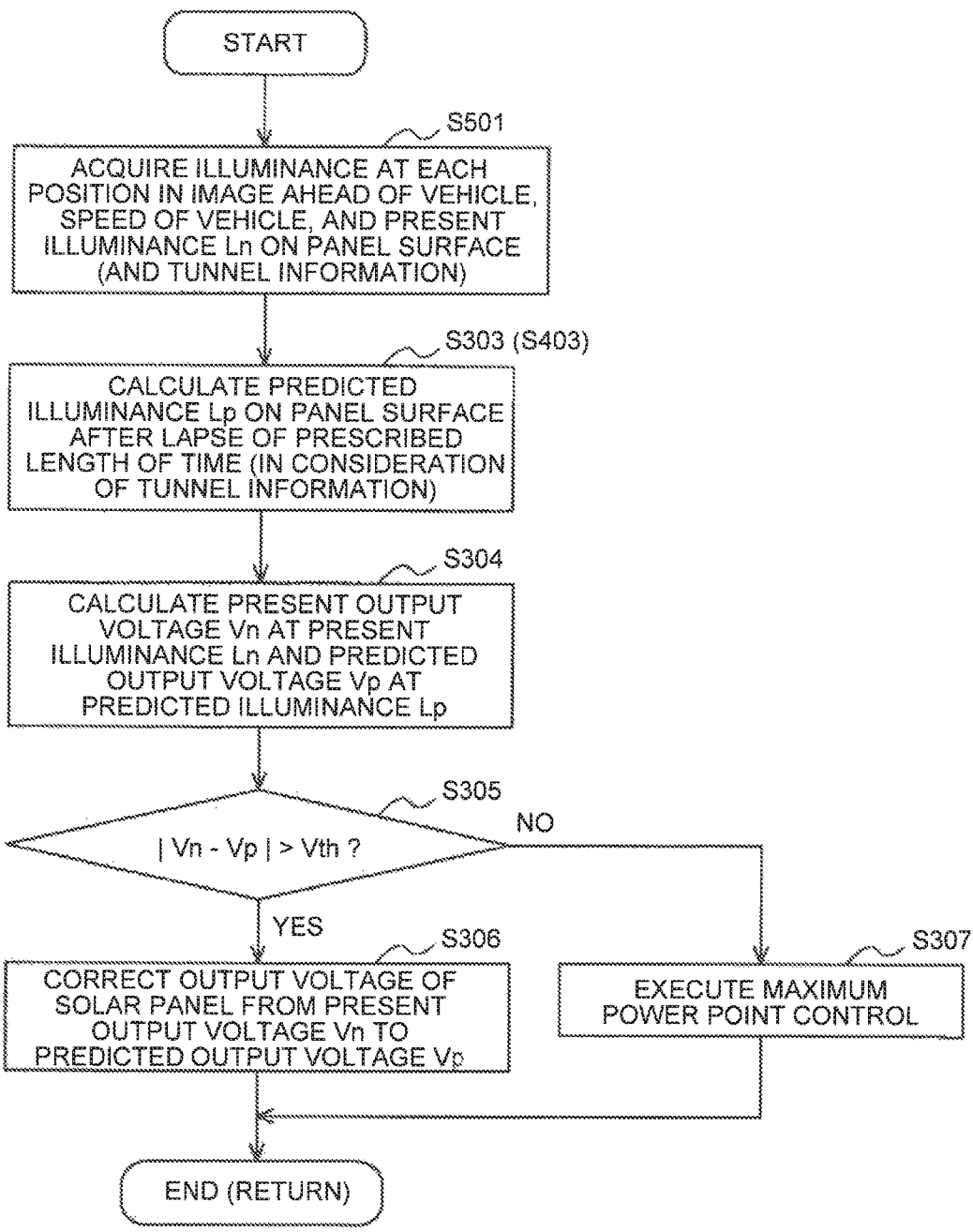
FIG. 5 is a flowchart illustrating control executed by a solar power generation control device according to a modified example of the disclosure.
Figure 6:
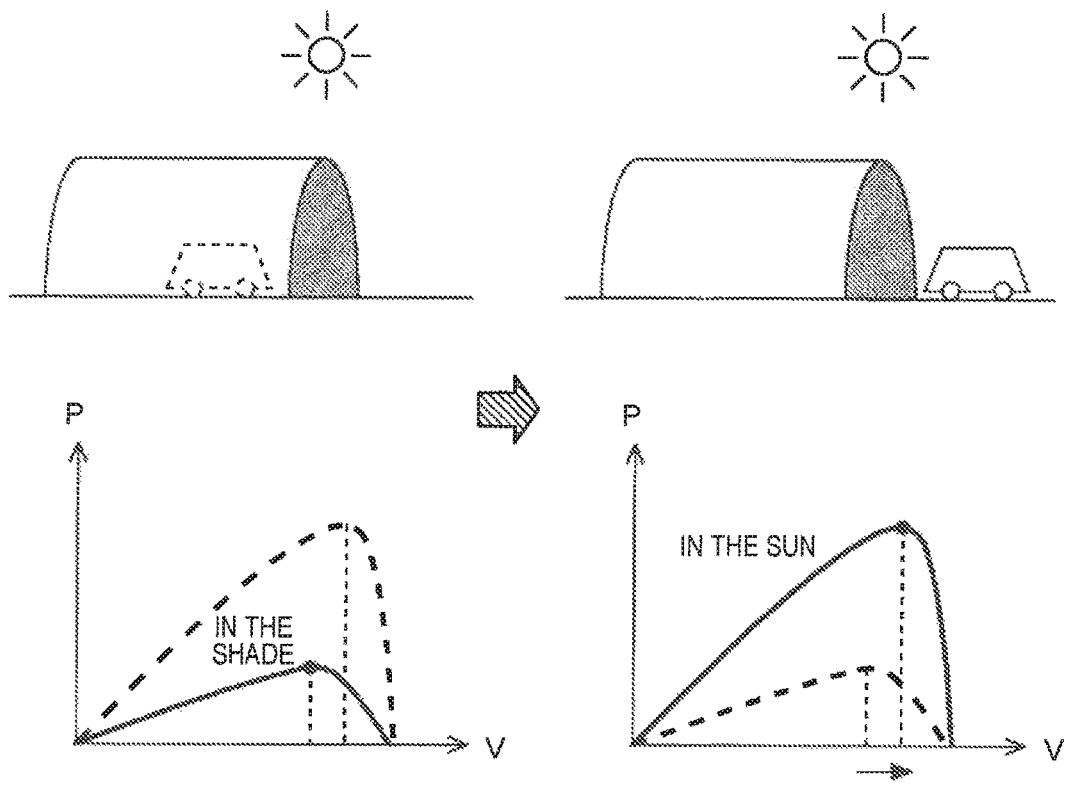
FIG. 6 is a diagram illustrating an example in which a significant change occurs in the state of solar radiation received at a solar panel.

FIG. 5 illustrates a flowchart illustrating the procedure of power generation control executed by the solar power generation control device 20 of the solar power generation system 1 according to the modified example. The power generation control according to the modified example illustrated in FIG. 5 differs from the power generation control according to each of the first example and the second example described above, in that the process in Step S501 is different from the process in each of Step S301 and Step S401, and Step S302 is omitted.

In Step S501, the acquisition unit 22 acquires an illuminance at each position in an image of a prescribed area ahead of a vehicle from the outside information acquisition unit 11. The acquisition unit 22 also acquires a travelling speed of the vehicle from the vehicle information acquisition unit 12. The acquisition unit 22 also acquires a present illuminance Ln on the panel surface of the solar panel 31 from the vehicle information acquisition unit 12. The acquisition unit 22 further acquires tunnel information from the road information acquisition unit 13, if necessary. After the illuminance at each position in the image of the prescribed area ahead of the vehicle, the travelling speed of the vehicle, the present illuminance Ln on the panel surface, and, if necessary, the tunnel information, are acquired, the process proceeds to Step S303 or Step S403.

The solar power generation system 1 including the solar power generation control device 20 according to the modified example produces the same operation and advantageous effects as those of the solar power generation system 1 including the solar power generation control device 20 according to foregoing embodiment.

The solar power generation control device according to the disclosure is applicable to movable bodies, such as vehicles, and is useful especially in a case where the efficiency of power generation by the solar panel is required to be kept high even under an environment where the maximum power point of the solar panel significantly varies.

What is claimed is:

1. A solar power generation control device configured to control power generated by a solar panel mounted on a vehicle by a maximum power point tracking method, the solar power generation control device comprising:
    a memory configured to store illuminances on a panel surface of the solar panel and output voltages of the solar panel at which the power generated by the solar panel is maximized at the corresponding illuminances, the illuminances and the output voltages being associated with each other;
    acquisition circuitry configured to acquire a travelling speed of the vehicle, a present illuminance on the panel surface, and first information indicating an illuminance in a prescribed area ahead of the vehicle;
    calculation circuitry configured to calculate a predicted illuminance on the panel surface based on the first information and the travelling speed, the predicted illuminance being an illuminance on the panel surface after a lapse of a prescribed length of time from a present time; and
    control circuitry configured to
        i) calculate an absolute value of a difference between a first output voltage at which maximum power is obtained at the present illuminance, and a second output voltage at which maximum power is obtained at the predicted illuminance, with reference to information stored in the memory,
        ii) determine whether the absolute value of the difference exceeds a prescribed threshold, and
        iii) correct, when the absolute value of the difference is determined to exceed the prescribed threshold, an output voltage of the solar panel such that the output voltage of the solar panel coincides with the second output voltage upon the lapse of the prescribed length of time, to execute maximum power point tracking control.

2. The solar power generation control device according to claim 1, wherein the prescribed threshold is set to a value equal to or larger than a minimum voltage width within which the control circuitry is able to control the output voltage of the solar panel.

3. The solar power generation control device according to claim 1, wherein the prescribed length of time is equal to a control period with which the solar power generation control device repeatedly executes the maximum power point tracking control.

4. The solar power generation control device according to claim 1, wherein:
    the acquisition circuitry further acquires tunnel information about a position of a tunnel that lies on a travelling route;
    the calculation circuitry calculates a predicted illuminance on the panel surface based on the tunnel information, in addition to the first information and the travelling speed; and
    the control circuitry corrects, based on the predicted illuminance calculated in consideration of the tunnel information, the output voltage of the solar panel to an output voltage at which the maximum power is obtained at the predicted illuminance.

5. A solar power generation control device configured to control power generated by a solar panel mounted on a movable body, the solar power generation control device comprising:
    a memory configured to store information about illuminances corresponding to solar radiation received at the solar panel and output voltages of the solar panel at which the power generated by the solar panel is maximized at the corresponding illuminances, the information about the illuminances and the output voltages being associated with each other;
    acquisition circuitry configured to acquire first illuminance information about an illuminance corresponding to solar radiation presently received at the solar panel and second illuminance information about an illuminance at a location ahead of the movable body in a travelling direction of the movable body; and
    calculation circuitry configured to vary the output voltage of the solar panel based on a difference between the first illuminance information and the second illuminance information.

6. A solar power generation system comprising:
    a solar panel mounted on a vehicle and configured to generate power;
    outside information acquisition circuitry configured to capture an image of a prescribed area ahead of the vehicle in a travelling direction of the vehicle, determine an illuminance at each position in the captured image, and output first information about the determined illuminance; and
    a solar power generation control device configured to control power generated by the solar panel by a maximum power point tracking method, the solar power generation control device including
        a memory configured to store illuminances on a panel surface of the solar panel and output voltages of the solar panel at which the power generated by the solar panel is maximized at the corresponding illuminances, the illuminances and the output voltages being associated with each other,
        acquisition circuitry configured to acquire the first information, a travelling speed of the vehicle, and a present illuminance on the panel surface,
        calculation circuitry configured to calculate a predicted illuminance on the panel surface based on the first information and the travelling speed, the predicted illuminance being an illuminance on the panel surface after a lapse of a prescribed length of time from a present time, and
        control circuitry configured to
            i) calculate an absolute value of a difference between a first output voltage at which maximum power is obtained at the present illuminance, and a second output voltage at which maximum power is obtained at the predicted illuminance with reference to information stored in the memory,
            ii) determine whether the absolute value of the difference exceeds a prescribed threshold, and iii) correct, when the absolute value of the difference is determined to exceed the prescribed threshold, an output voltage of the solar panel such that the output voltage of the solar panel coincides with the second output voltage upon the lapse of the prescribed length of time, to execute maximum power point tracking control.

\* \* \* \* \*